United States Patent [19]

Miyamae

[11] 4,006,867
[45] Feb. 8, 1977

[54] MOTORIZED FISHING REEL WITH CLUTCHES

[76] Inventor: Toshiaki Miyamae, 2-16, 2-chome, Nishi-Iwata, Higashi-Osaka, Osaka, Japan

[22] Filed: Aug. 20, 1975

[21] Appl. No.: 606,216

[52] U.S. Cl. .......................... 242/217; 242/84.1 A
[51] Int. Cl.² ............... A01K 89/017; A01K 89/02
[58] Field of Search .......... 242/215, 217, 218, 219, 242/211, 212, 214, 84.1 A, 84.1 R

[56] References Cited

UNITED STATES PATENTS

| 147,414 | 2/1874 | MacCord | 242/84.1 R |
| 2,531,610 | 11/1950 | Butzman | 242/214 |
| 3,325,117 | 6/1967 | Hiromitsu | 242/214 |
| 3,675,870 | 7/1972 | Ride et al. | 242/84.1 A |
| 3,799,472 | 3/1974 | Svensson | 242/217 |

FOREIGN PATENTS OR APPLICATIONS 482,292   6/1953   Italy ................................. 242/219

Primary Examiner—Billy S. Taylor
Attorney, Agent, or Firm—Moonray Kojima

[57] ABSTRACT

This invention is concerned with a novel construction of a motorized fishing reel provided at one side with a mechanism including a motor pinion, a reduction gear selectively transmitting a driving force from the pinion, a clutch plate contactable with the reduction gear, a reduction pinion rotatable by the clutch plate, and a main gear engageable with the reduction pinion thereby enabling a fisherman to freely operate the reel with a single hand.

1 Claim, 1 Drawing Figure

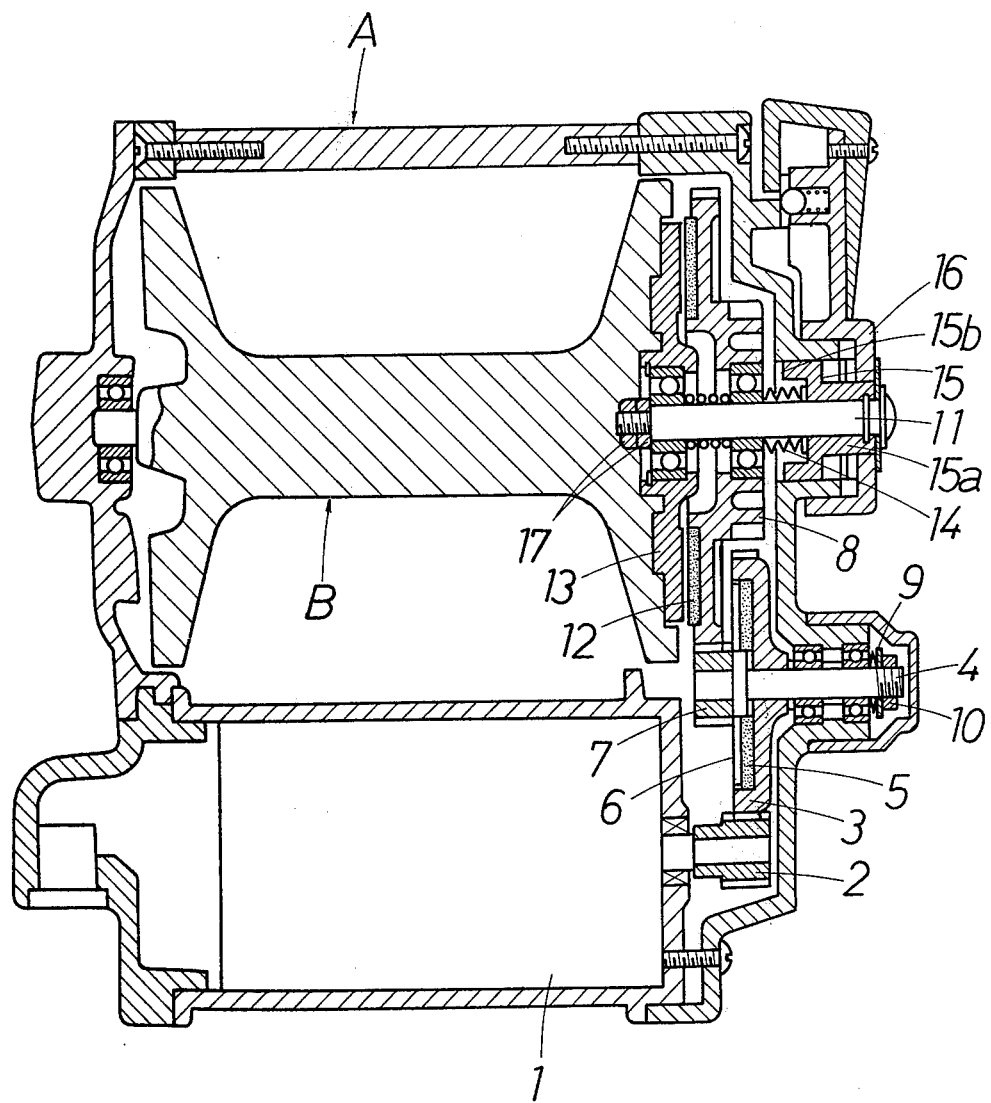

MOTORIZED FISHING REEL WITH CLUTCHES

The present invention relates generally to improvements in a motorized fishing reel, and more particularly to the improved construction of the reel which is light in weight and small in size with all the power transmission mechanisms mounted on one side only of the reel.

Most of the conventional motorized fishing reels on the market are so adapted to support a spool on both sides of a reel body that for the structural reasons thereof, very few fishermen are able to quickly and easily drop in the sea a desired fishing line having a strength suitable to the size and kind of fish they encounter.

In order to eliminate or mitigate the above-mentioned disadvantages, many attempts have thus far been made with little success since, according to the conventional motorized fishing reels, a spool wound with a fishing line is generally supported on both ends of a spool shaft mounted axially on the reel frame so that in order to exchange the spool for another one externally of the reel, it is necessary to remove one of the shaft ends from the reel, thereafter removing the other end therefrom.

Thus in order to obtain a fishing reel of such an improved type that both ends of a shaft supporting the spool can be easily removed from the reel, it is necessary to house the reel in a larger reel frame than the existing one, consequently a greater number of particular parts being necessay to constitute the reel frame, resulting in the reel frame being made structurally more complicated and dimensionally much larger in addition to a lot of time and cost required to manufacture the reel products.

Accordingly, the present invention has been designed with a view to eliminating all the above-mentioned drawbacks and disadvantages, and has as one of its main objects the provision of a motorized fishing reel having the construction wherein all the mechanisms for transmitting power from a torque motor to a spool are mounted at one side of the reel.

Another object of the invention is to provide a reel having an adjusting means mounted externally thereof so as to adjust the actuation of a clutch means adapted to selectively transmit power from the motor to the spool, a control lever for controlling an overload that might be unduly caused to the spool, and a mechanism for preventing the motor from being burnt even if the control lever is erroneously manipulated.

These and other objects, features and advantages of the present invention will become apparent from the following detailed description when taken in conjunction with the accompanying drawing showing a vertically cross sectioned view of the invention.

The figure of the drawing is substantially a central sectional view.

Setting forth now in detail the present invention with reference to the drawing, reference character A designates a reel frame wherein a torque motor 1 is housed. From said motor 1 there is axially projected a motor pinion 2 intermeshingly engaged with a reduction gear 3 which is supported on a shaft 4 in freely rotatable relation wherein a rotary power from the motor 1 is reduced to a pre-determined rotary speed ratio through the reduction gear 3. To one side of the reduction gear 3 there is inseparably adhered a lining 5 and in opposed relation thereto a first clutch plate 6 is supported on said shaft 4 in freely rotatable relation. On the foremost left end of the shaft 4 adjacent to the first clutch plate 6 a reduction pinion 7 attached to the first clutch plate 6 is supported in freely rotatable relation. With the reduction pinion 7 is intermeshingly engaged a main gear 8. In the other foremost right end of said shaft 4 there is inserted a dished head spring 9 while adjusting nut 10 is screwably engaged with said other foremost end to forcibly press the nut 10 against the spring 9 from the outside of the reel frame A so that when the nut 10 is turned in one direction from the outside by use of a suitable hand tool such as a wrench, said flat head spring 9 is constrictively pressed to force the reduction gear 3 against the first clutch plate 6 thereby causing the lining 5 to frictionally engage with the first clutch plate 6. In other words, with the cap covering (unnumbered) removed, by use of a wrench, nut 10 can be tightened or lossened to cause lining 5 to engage or disengage with clutch plate 6. The result is that the rotary power from the motor 1 reduced to a pre-determined rotary speed ratio through the reduction gear 3 is transmitted to the reduction pinion 7, causing to rotate the main gear 8 intermeshed with the reduction pinion 7.

Said main gear 8 is supported on a main shaft 11 in freely rotatable relation and has a lining 12 inseparably adhered to one side thereof. In frictionally contactable relation with said lining 12 a second clutch plate 13 is supported on said main shaft 11 and a second dished head spring 14 is inserted into the main shaft 11 in frictionally contactable relation with the other side thereof. In contiguity to said second dished head spring 14 a cam means 15 comprising a convex shaft cam member 15a and a concave shape cam member 15b formed in slidable engageable relation with one another is supported on the main shaft 11.

On the foremost right end of the main shaft 11 adjacent to said cam 15 there is rigidly fixed a control lever 16 which is manually operable from the outside of the reel frame A while the other left end of the shaft 11 is tightly screwed by means of a tightening nut 17 so that by turning the control lever 16 in one direction the convex cam member 15a is slidably moved to engage with the concave cam member 15b, pressing the spring 14 against the main gear 8 to frictionally engage the lining 12 with the second clutch plate 13; the result being that the main gear 8 and the clutch plate 13 are caused to rotate.

As has been clearly mentioned above, all the power transmission mechanisms of the motorized fishing reel in accordance with the present invention are mounted on one side only of the reel so that, while holding with one hand a fishing rod provided with the reel A, fishermen are able with the other free hand to adjust the frictional engagements of said first clutch plate 6 with the first lining 5, and of the second clutch plate 13 with the second lining 12, respectively, by using such a hand tool as a wrench and also manipulate the control lever 16 externally from one side of the reel frame A.

Further according to the invention, the other side of the reel frame A provides a place for detachably mounting thereto a unit comprising a spool B and a shaft rotatably supporting the spool B and journalled on the unit. Thus by mounting the unit to said other side of the reel frame A to keep the other side of the spool B in contact with the second clutch plate 12, the rotation of the main gear 8 is transmitted to the spool B to rotate the same.

If an overload is caused in practical use of the reel to the rotation of the spool B subject to the response to an angled fish when a fishing line is being retrieved onto the spool B, the control lever 16 is externally manipulated to loosen the constrictively pressed state of the flat head spring 14 so as to release the frictional contact of the lining 12 with the second clutch plate 8 whereby the fishing line is smoothly retrieved onto the spool B free of a fear that otherwise the line might be cut in its midway portions due to the undue stretch loaded thereon.

Further in the event the frictional engagement of the second clutch plate 8 with the lining 12 fails to be released due to erroneous manipulation of the control lever 16 and an overload caused to the rotation of the spool B is directly transmitted to the reduction gear 7 to force the latter to rotate reversely, the first clutch plate 6 (being of suitable construction) will frictionally slide with respect to the lining 5 of the reduction gear 3 so as to prevent the reverse rotation of the reduction gear 3 from being further transmitted to the pinion 2 of the motor 1 whereby no burning is caused to the motor 1.

Incidentally, the main gear 8 may also be provided at one side thereof with inner teeth (not shown) engageable with a ratchet (not shown) so as to prevent the spool B from being reversely rotated.

As has been mentioned in the foregoing, all the power transmission mechanisms of the present invention are mounted on one side only of the reel frame A so that the spool B can be easily exchanged for another suitable one as desired.

Though one specific embodiment of the present invention has been shown and described herein, it will be apparent to those skilled in the art that the invention is not restricted to the details set forth by many changes and modifications may be made without departing from the spirit and scope of the invention as defined in the annexed claims.

What is claimed is:
1. A motorized fishing reel comprising
a reel frame;
a torque motor housed in said frame;
a power transmission means including a pinion connected to said motor for transmitting rotary power from said motor;
a first shaft held by said frame;
reduction gear means freely rotatable about said first shaft and engageable with said pinion;
a first lining attached to one side of said reduction gear;
first clutch means including first clutch plate frictionally contactable with said first lining of said reduction gear;
reduction pinion means freely rotatable about one end of said first shaft and attached to said first clutch plate;
dished head spring held by said first shaft exerting pressure from the other side of said reduction gear;
nut means held by first shaft for manually adjusting the frictional engagement of said reduction gear with said first clutch plate by regulating the pressure of said dished head spring acting against said reduction gear;
a second shaft held by said frame;
main gear means freely rotatable about said second shaft and engagable with said reduction pinion;
a second lining attached to one side of said main gear;
a second clutch plate freely rotatable about said second shaft and mounted adjacent said second lining and frictionally contactable therewith;
second dished head spring mounted on said second shaft and contactable with the other side of said main gear;
cam means mounted on said second shaft, including a cylindrical cam member having a convex surface and a cylindrical cam member having a concave surface slidably engagable with one another;
manual control lever for slidably engaging said convex member with said concave member thereby to forcibly press said second dished head spring against said main gear thereby frictionally engaging said second lining with said main gear;
a third shaft held by said frame; and
spool means supported at end by said second shaft and at the other end by said third shaft.

* * * * *